United States Patent
Möcke et al.

(10) Patent No.: US 12,480,238 B2
(45) Date of Patent: Nov. 25, 2025

(54) UNIDIRECTIONAL LAID NONWOVEN AND USE THEREOF

(71) Applicant: SAERTEX GMBH & CO. KG, Saerbeck (DE)

(72) Inventors: Dietmar Möcke, Münster (DE); Steven Bakker, Münster (DE); Christoph Engeler, Telgte (DE)

(73) Assignee: SAERTEX GMBH & CO. KG, Saerbeck (DE)

( * ) Notice: Subject to any disclaimer, the term of this patent is extended or adjusted under 35 U.S.C. 154(b) by 0 days.

(21) Appl. No.: 16/764,927

(22) PCT Filed: Nov. 23, 2018

(86) PCT No.: PCT/EP2018/082459
§ 371 (c)(1),
(2) Date: May 18, 2020

(87) PCT Pub. No.: WO2019/101975
PCT Pub. Date: May 31, 2019

(65) Prior Publication Data
US 2020/0291557 A1    Sep. 17, 2020

(30) Foreign Application Priority Data

Nov. 24, 2017    (DE) ......................... 102017127868.0

(51) Int. Cl.
*D04H 3/004* (2012.01)
*B32B 5/02* (2006.01)
(Continued)

(52) U.S. Cl.
CPC ............. *D04H 3/004* (2013.01); *B32B 5/022* (2013.01); *B32B 5/06* (2013.01); *B32B 5/26* (2013.01);
(Continued)

(58) Field of Classification Search
CPC .. B32B 5/022; B32B 5/06; B32B 5/26; B32B 2603/00; B32B 5/073; B32B 17/067;
(Continued)

(56) References Cited

U.S. PATENT DOCUMENTS

| | | | |
|---|---|---|---|
| 5,520,984 A | 5/1996 | Gulino | |
| 2012/0100354 A1* | 4/2012 | Beraud | B32B 5/08 442/334 |

(Continued)

FOREIGN PATENT DOCUMENTS

| | | |
|---|---|---|
| CN | 201592537 U | 9/2010 |
| DE | 102011003560 A1 | 8/2012 |

(Continued)

OTHER PUBLICATIONS

German Office Action dated Jun. 21, 2018 for family member Application No. 102017127.860.0.
(Continued)

*Primary Examiner* — Matthew D Matzek
(74) *Attorney, Agent, or Firm* — Hudak, Shunk & Farine Co. LPA

(57) ABSTRACT

For the production of components made of fiber-reinforced composites, in particular for the production of rotor blade belts, a unidirectional non-crimp fabric made of glass fiber rovings is provided, the non-crimp fabric having a first stabilizing layer on the underside thereof and a second stabilizing layer on the upper side thereof, which layers are sewn together by pillar stitching.

15 Claims, 8 Drawing Sheets

(51) Int. Cl.
  *B32B 5/06* (2006.01)
  *B32B 5/26* (2006.01)
  *C03C 13/00* (2006.01)
  *D04H 3/115* (2012.01)
  *F03D 1/06* (2006.01)

(52) U.S. Cl.
  CPC .............. *C03C 13/00* (2013.01); *D04H 3/115* (2013.01); *F03D 1/0675* (2013.01); *B32B 2262/101* (2013.01); *B32B 2413/00* (2013.01); *B32B 2603/00* (2013.01)

(58) Field of Classification Search
  CPC ............ B32B 17/225003; B32B 17/20; B32B 2262/10; B32B 2262/101; D04H 3/004
  USPC ......................................................... 428/34.5
  See application file for complete search history.

(56) References Cited

U.S. PATENT DOCUMENTS

| | | | |
|---|---|---|---|
| 2015/0044438 A1* | 2/2015 | Baser | D04H 3/04 156/243 |
| 2015/0224759 A1* | 8/2015 | Boon | F03D 1/0675 156/324 |
| 2015/0258712 A1* | 9/2015 | Moser | D04H 3/115 428/113 |
| 2016/0288429 A1* | 10/2016 | Bergstrom | B29B 11/16 |

FOREIGN PATENT DOCUMENTS

| | | |
|---|---|---|
| DE | 102014222144 A1 | 5/2016 |
| EP | 2330292 A2 | 6/2011 |
| EP | 2927361 A1 | 10/2015 |
| GB | 2249050 A | 4/1992 |
| JP | S58171945 A | 10/1983 |
| WO | 2009087192 A1 | 7/2009 |

OTHER PUBLICATIONS

German Office Action dated Nov. 27, 2018 for family member Application No. 102017127.860.0.
Zhejiang Lianyang Compound Material Co L, High Strength Multi Axis Weave Felt Wind Turbine Blade Glass Short Cut Layer Mutual Vertical yarn Base Cloth Sew Line, Abstract No. 0, Jul. 30, 2009, 1 page, vol. 2010, No. 73, AN 2010-N55838, Thomas Scientific, London GB; XP002788156.

* cited by examiner

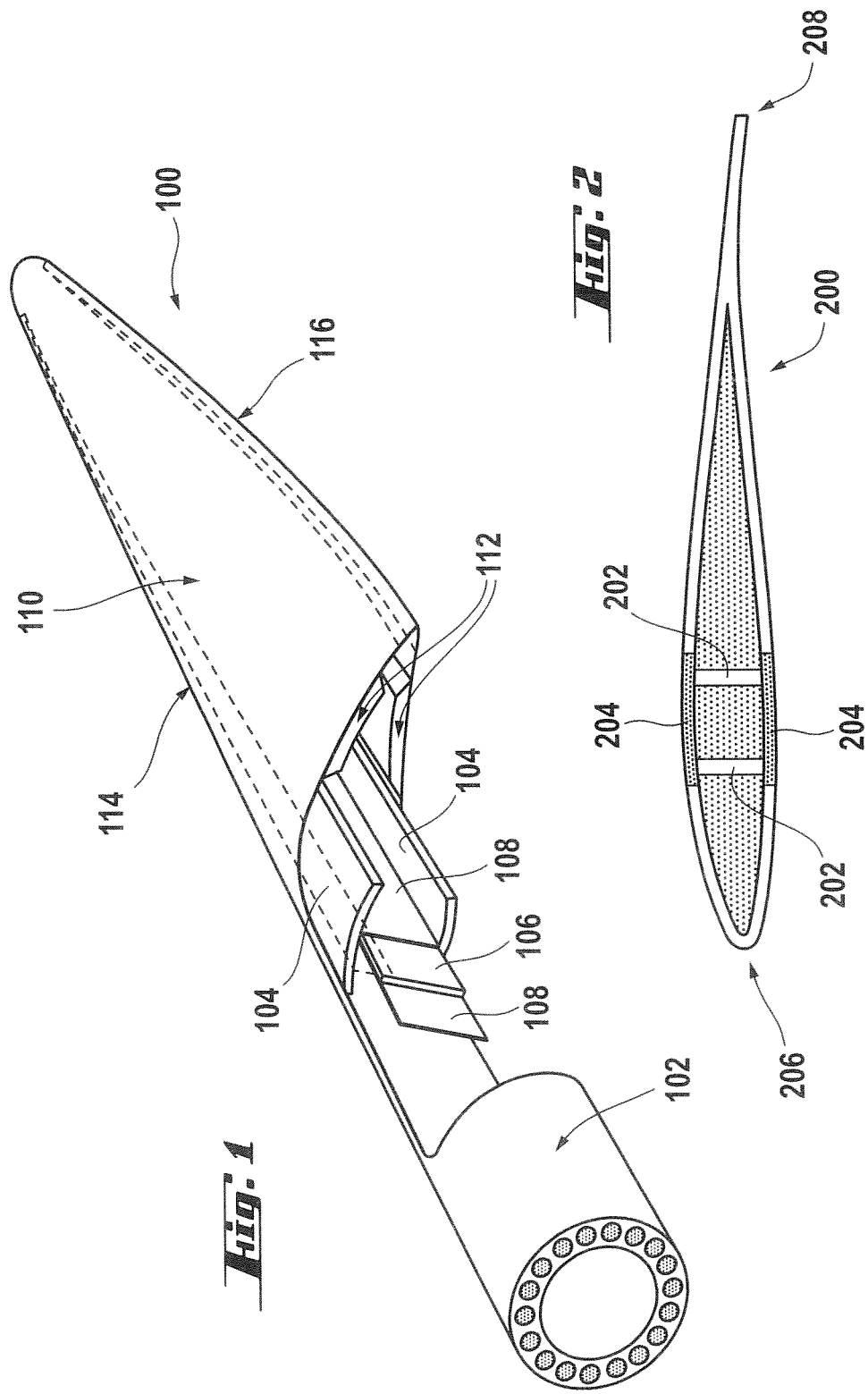

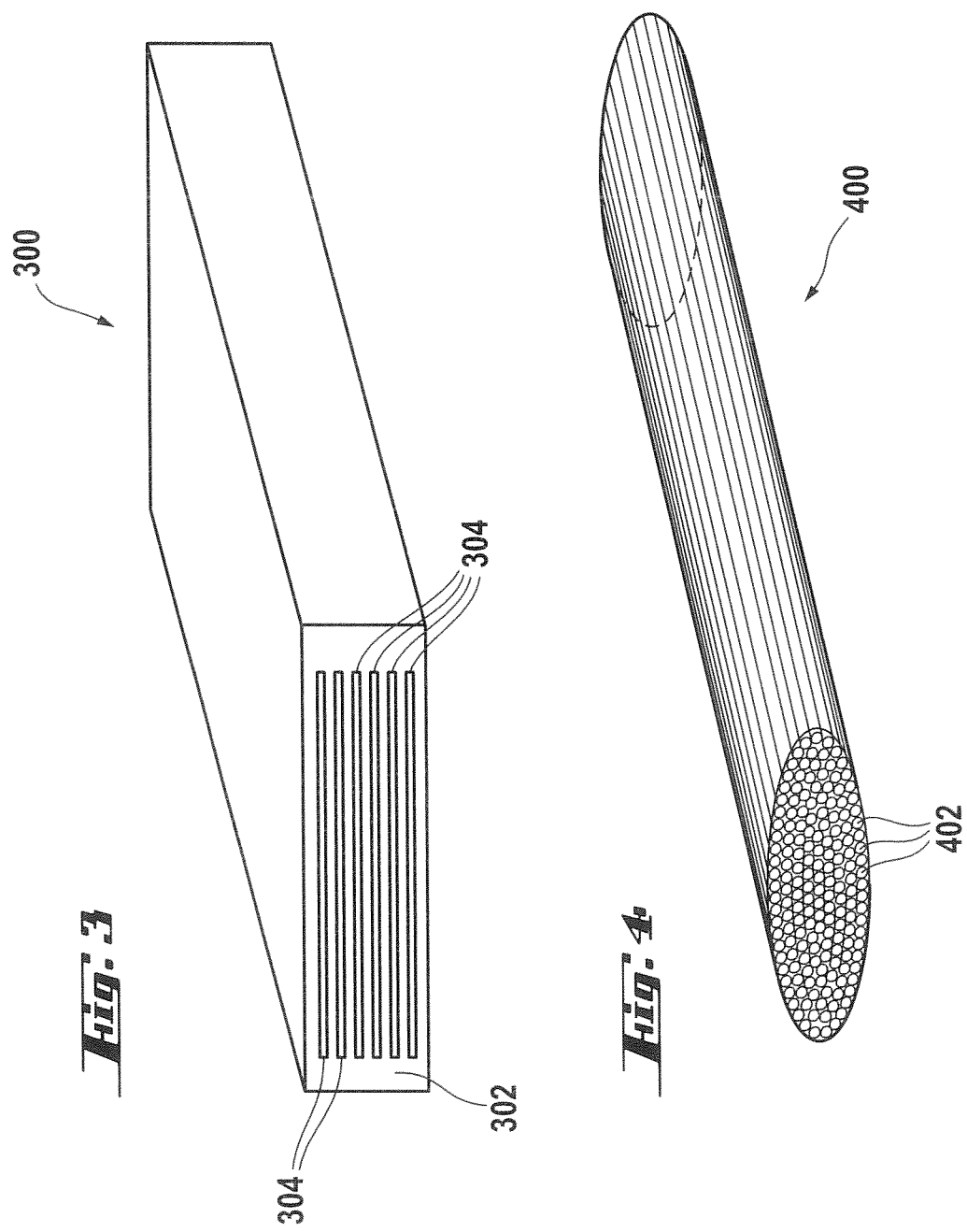

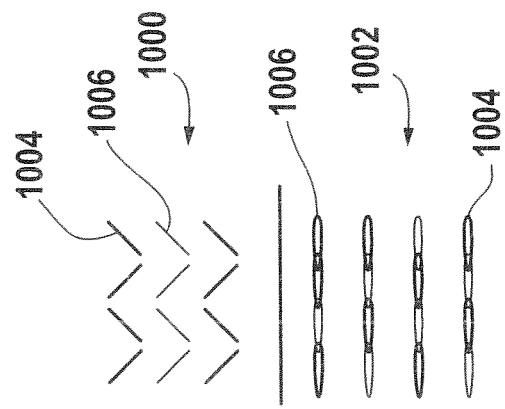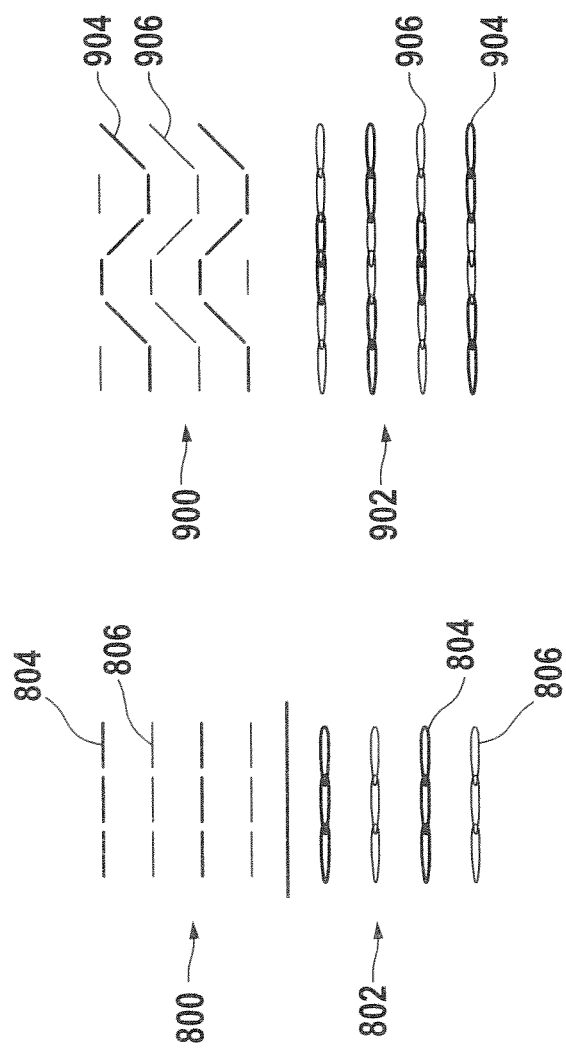

UNIDIRECTIONAL LAID NONWOVEN AND USE THEREOF

FIELD OF THE INVENTION

The present invention relates to a unidirectional non-crimp fabric made of glass fiber rovings for the production of fiber composites comprising a first stabilization layer on the underside thereof and a second stabilization layer on the upper side thereof, and use thereof.

BACKGROUND OF THE INVENTION

For the production of fiber composites, textile or fiber assemblies can be used ready impregnated with a matrix resin corresponding to the plastic to be reinforced, also called a prepreg, and can be further processed to produce components made of fiber-reinforced plastics, such as in the autoclave method using pressure and heat.

The use of dry textile assemblies, i.e. not impregnated with resin, is also widely known, which are further processed by means of resin injection methods, in particular vacuum-supported methods to produce components made of fiber-reinforced plastic materials. They are much easier to drape than ready impregnated textile assemblies. In the case of more complex components, in particular, it may be advantageous for later further processing by means of resin injection processes, to already drape the textile assembly, also called preform or preformed part, to the desired shape, at least to a small degree and, as the case may be, to fix it in this shape by the addition of small amounts of binder and the application of low heat and/or pressure.

The textile assemblies may be fleeces, mats, woven fabrics, braided fabrics, knitted fabrics, and, in particular, non-crimp fabrics. Non-crimp fabrics can be formed of one, two or more layers of fibers each arranged parallel to each other. A fabric in which all layers have essentially the same orientation of the fibers, i.e. where in each layer the great majority of the fibers, e.g. 95% or more of the fibers, have the same orientation, is termed a unidirectional non-crimp fabric. If it has layers having two different fiber orientations, it is termed a biaxial non-crimp fabric. If it has layers having more than two different fiber orientations, it is termed a multiaxial non-crimp fabric. As a rule, a unidirectional non-crimp fabric has one fiber layer, a biaxial non-crimp fabric hat two fiber layers, and a multiaxial non-crimp fabric has three or more fiber layers.

The fibers may be filaments, yarns, i.e. twisted and/or twilled filament bundles, or rovings, i.e. untwisted bundles of approximately parallel bundled endless filaments. Due to the use of filaments arranged parallel to each other, rovings have the advantage of particularly advantageous reinforcing properties and a high fiber volume percentage. In non-crimp fabrics, in particular, the rovings can be spread to achieve a thin sheet-like textile assembly. Within a unidirectional non-crimp fabric, the individual rovings can be arranged more or less spaced from each other or in part or completely overlapping each other. Few, some, many, the great majority, or all, of the rovings may be spread.

The fibers can be made, for example, of carbon or glass, wherein the carbon fibers have substantially higher tensile strength than glass fibers. In their further processing to textile assemblies, in particular in the form of non-crimp fabrics, glass fibers are more complex to handle, since they have substantially smoother surfaces than carbon fibers and thus tend to slide with respect to each other. In particular, the fibers can slip or slide during the feeding of unidirectional layers in knitting machines up to the point of stitching. Carbon fibers, on the other hand, can get tangled with each other due to their rougher surfaces and thus hold each other in a predetermined position. However, glass fibers are substantially cheaper than carbon fibers.

SUMMARY OF THE INVENTION

It is an object of the present invention to provide an alternative unidirectional non-crimp fabric of glass fiber rovings.

The object is achieved by a unidirectional non-crimp fabric of glass fiber rovings for the production of fiber composites comprising a first stabilization layer on the underside thereof and a second stabilization layer on the upper side thereof, wherein they are sewn to each other by means of pillar stitching.

By providing two stabilizing layers and the pillar stitching the ease of handling of the unidirectional non-crimp fabric of glass fiber rovings can be improved since slipping of the rovings can be more effectively prevented and drapability of the fabric can be improved. This applies, in particular, to unidirectional non-crimp fabrics comprising only one glass fiber roving layer.

Sewing is understood to mean the mechanical connection by means of a stitching process. This can be performed, for example, on a warp knitting machine or a sewing-knitting machine. The thread used therefor can be termed a sewing thread or a knitting thread. The pillar stitching has the advantage over other stitching methods, such as tricot stitching or 2×1 laps or knitting etc., that the wales formed during the stitching have no lateral connection. It has been found, that the considerably increased drapability of the fabric is not the only advantage. Preferably, the glass fiber rovings extend in the longitudinal direction of the unidirectional non-crimp fabric.

Particularly preferably, the pillar stitching extends essentially parallel to the glass fiber rovings. Thereby the described effect of good drapability and impregnability can be further enhanced. Moreover, this helps to achieve that the non-crimp fabric has only little, up to and including no, undulation, which also results in excellent drapability.

This effect is particularly noticeable when stitching is performed true to gauge.

Advantageously, pillar stitching has a stitch density of between 5 stitches per inch (spi) and 12 stitches per inch (spi). This results in good stabilization of the non-crimp fabric while at the same time achieving good drapability without undulation, and good impregnating properties.

In preferred embodiments, at least one stabilizing element is present in parallel to the direction of the non-crimp fabric. It can be present in endless form or with finite length dimension. This can simplify rectilinear and straight placing of the non-crimp fabric in a mould for further processing to produce a component made of a fiber-reinforced composite.

Advantageously, the at least one stabilizing element is rod-shaped. The mechanical properties of the unidirectional non-crimp fabric can thus be improved in view of the reinforcing properties in components made of a fiber-reinforced composite.

Preferably, the at least one stabilizing element is formed of glass fiber and resin. The pultrusion method is a continuous manufacturing process for the production of fiber-reinforced plastic sections, the pultrudates. Due to their excellent mechanical properties, they can be used, in turn, as reinforcements in the production of fiber-reinforced composite materials. Advantageously, the resin of the pultrudate is chosen to match the matrix resin of the final fiber-reinforced composite.

Preferably, the first and/or the second stabilizing layer is formed as a weft layer and/or as a fleece and/or as a mat. Mats are non-woven sheet-like objects (also referred to as nonwovens) which can be made of chopped or endless, mostly irregularly laid spun threads or fibers. Fleeces are also non-woven sheet-like objects (also referred to as non-wovens) of statistically irregular endless fibers, which can also be spun.

Weft layers are understood to be layers of individual filaments, threads, or rovings widely spaced from each other, having an orientation that is different from that of the unidirectional non-crimp fabric. A space of at least half the width of the glass fiber rovings of the non-crimp fabric is considered to be widely spaced. If the glass fiber rovings have different widths, the half the median value of the widths is supposed to be the relevant dimension.

Preferably, at least one stabilizing layer comprises a weft layer, wherein the weft layer is arranged at an angle in the range of 65° to 110°, preferably 80° to 100°, with respect to the direction of the non-crimp fabric, wherein the direction of the non-crimp fabric is defined by the orientation of the glass fiber rovings of the unidirectional fabric layer or non-crimp fabric layers. This helps to achieve the best possible stabilizing effect in the stabilizing layer by excellent cohesion in the direction transverse to the direction of the non-crimp fabric. Particularly preferably, both stabilizing layers comprise a weft layer arranged at essentially the same angle with respect to the direction of the non-crimp fabric. Particularly preferably, one or even both stabilizing layers consist of such a weft layer.

In the case that at least one stabilizing layer comprises such a weft layer, this weft layer is preferably of a glass fiber material. This has the advantage that the choice of the resin for the production of a fiber-reinforced composite is not additionally limited by the type of weft layer. Advantageously, the at least one weft layer comprises glass fiber rovings having a weight of between 34 tex and 300 tex, preferably between 40 tex and 150 tex, particularly preferably between 40 tex and 80 tex, to achieve the best possible stabilizing effect while reducing the material in the stabilizing layer.

In the case that both stabilizing layers comprise a weft layer, the weft layers are advantageously joined true to mesh. This helps to achieve a more uniform or more homogeneous structure of the fabric. Moreover, the glass fiber rovings are laid particularly flat so that when two or more of the unidirectional non-crimp fabrics are placed on top of each other for further processing, their glass fiber roving layers have a smaller distance to each other. Overall, the stitching true to mesh of the weft layers has a positive effect on the mechanical properties of the resulting components of fiber-reinforced composite material.

Preferably, the unidirectional non-crimp fabric of glass fiber rovings according to the present invention, is used for the production of components of wind turbines, preferably of rotor blade components, particularly preferably of rotor blade belts. The unidirectional non-crimp fabrics of the present invention allow the production of fiber-reinforced composites having excellent strength characteristics, such as are necessary for components of wind turbines, in particular for rotor blade components and especially for rotor blade belts.

BRIEF DESCRIPTION OF THE DRAWINGS

The present invention will be explained in more detail with reference to a preferred exemplary embodiment. In the drawings:

FIG. 1 schematically shows the structure of a rotor blade of a wind turbine;

FIG. 2 schematically shows a sectional view of the structure of a rotor blade of a wind turbine;

FIG. 3 schematically shows the structure of a rotor blade belt;

FIG. 4 schematically shows the structure of a glass fiber roving;

FIG. 8 schematically shows front and rear views of pillar stitching;

FIG. 9 schematically shows front and rear views of tricot pillar stitching;

FIG. 10 schematically shows front and rear views of tricot stitching;

DETAILED DESCRIPTION OF THE INVENTION

Figure 5:
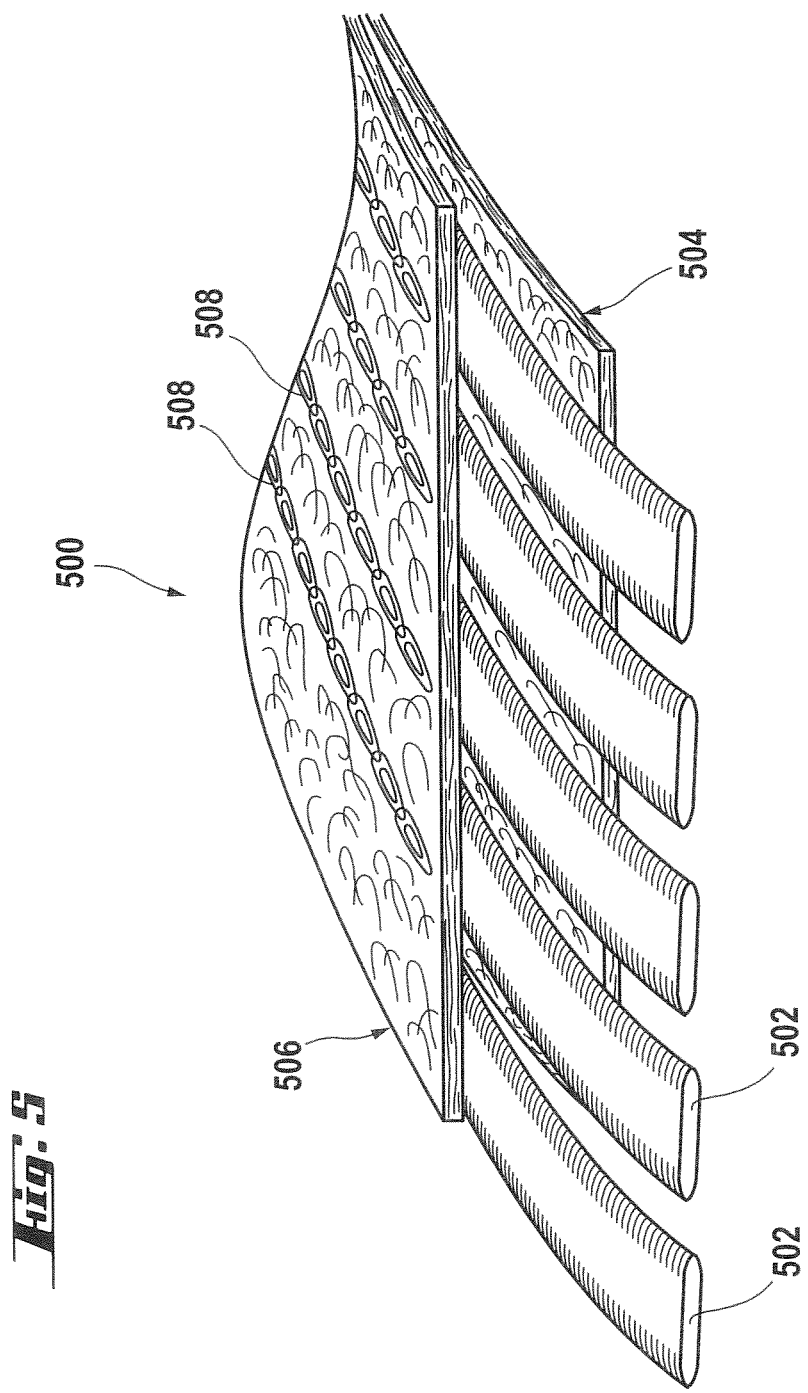
FIG. 5 schematically shows the structure of a unidirectional non-crimp fabric comprising two stabilizing layers of a fleece.

Due to their strength characteristics, fiber-reinforced composites made using the unidirectional non-crimp fabrics of glass fiber rovings provided here are particularly suitable for the production of components for wind turbines. FIG. 1 schematically shows the basic construction of a rotor blade 100 of a wind turbine. The rotor blade 100 is fixed to the rotary axle of a wind turbine as an extension of the root section 102. Below the shell 110, on the upper side and the underside, a belt 104 extends across shear webs 106, only one of which is shown in FIG. 1. The belts extend closer to the leading edge 114 than the trailing edge 116. FIG. 2 schematically shows a rotor blade 200 in cross-section, comprising belts 204 and shear webs 202, wherein each of the positions of the trailing edge 208 and the leading edge 206 are shown. The belts 204 extend along the entire rotor blade from the root section to the blade tip.

The belts 104 receive the main load of the forces acting on the rotor blade 100 when wind is blowing, and transmit them via the axle hub to a nacelle of the wind turbine, to generate electrical energy from the kinetic wind energy. This is why the belts have to have particularly high tensile stiffness in the longitudinal extension of the rotor blade, which is why a fiber-reinforced composite on the basis of a unidirectional non-crimp fabric is particularly suitable. Unidirectional non-crimp fabrics can also be used at the leading and trailing edge areas. Due to the different mechanical requirements, bi-, tri- or multiaxial fabrics can also be used for other rotor blade components, such as the shell 110, the shear web reinforcements 108, the core region 112 or the root section 102.

FIG. 3 schematically shows the basic construction of a rotor blade belt 300. A plurality of non-crimp fabrics 304 was stacked in accordance with the shape of the belt 300 to be produced, treated with resin 302, and this resin-containing overall structure was cured. This can be done using various methods known to the person skilled in the art: in the RTM method (Resin Transfer Moulding), for example, the resin 302 is injected into a closed mould, in which the non-crimp fabrics 304 have been placed before. In the vacuum infusion method, the non-crimp fabrics 304 are placed into the mould and covered by an air-tight plastic film. The resin 302 is sucked into the fabrics 304 between the mould and the film with the aid of a vacuum. Once the resin 302 is cured, the plastic film is removed and the belt 300 is taken out of the mould. Suitable resins and process parameters are known to the person skilled in the art.

FIG. 4 schematically shows a glass fiber roving 400 comprising a plurality of glass filaments 402. Usually, glass fiber rovings have a diameter of between about 12 μm and about 24 μm. For the production of rotor blade belts, in particular, glass fiber rovings 400 having a diameter of between about 17 μm and 24 μm may be suitable. Typical weights are about 1000 tex to 9600 tex, preferably 2400 to 4800 tex.

FIGS. 5 to 7 and 13 schematically show the structure of various unidirectional non-crimp fabrics 500, 600, 700, 1300 made of glass fiber rovings 502, 602, 702, 1302 for the production of fiber-reinforced composites comprising a first stabilizing layer 504, 604, 704, 1304 at its underside and a second stabilizing layer 506, 606, 706, 1306 at its upper side, stitched together by a knitting thread 508, 608, 708, 1308. For better identification of the details in the drawings, the unidirectional non-crimp fabrics 500, 600, 700, 1300 shown with reference to the present example are variants that are stitched true to gauge and essentially parallel to the glass fiber rovings 502, 602, 702, 1302. The glass fiber rovings 502, 602, 702, 1302 form an unfixed, freely spread layer, wherein for better understanding, the glass fiber rovings 502, 602, 702, 1302 are shown substantially spaced and slightly spread. In further variants, the stitching can also be not true to gauge and/or parallel to the glass fiber rovings 502, 602, 702, 1302. Both the stitching true to gauge and the parallel stitching result in particularly uniformly structured non-crimp fabrics without fiber damage and with reduced undulation tendency. This has a positive effect on the mechanical properties of the resulting components made of fiber-reinforced composite. Moreover, the spacing of the glass fiber rovings 502, 602, 702, 1302 or, as the case may be, their overlap and their degree of spreading may vary.

Figure 6:
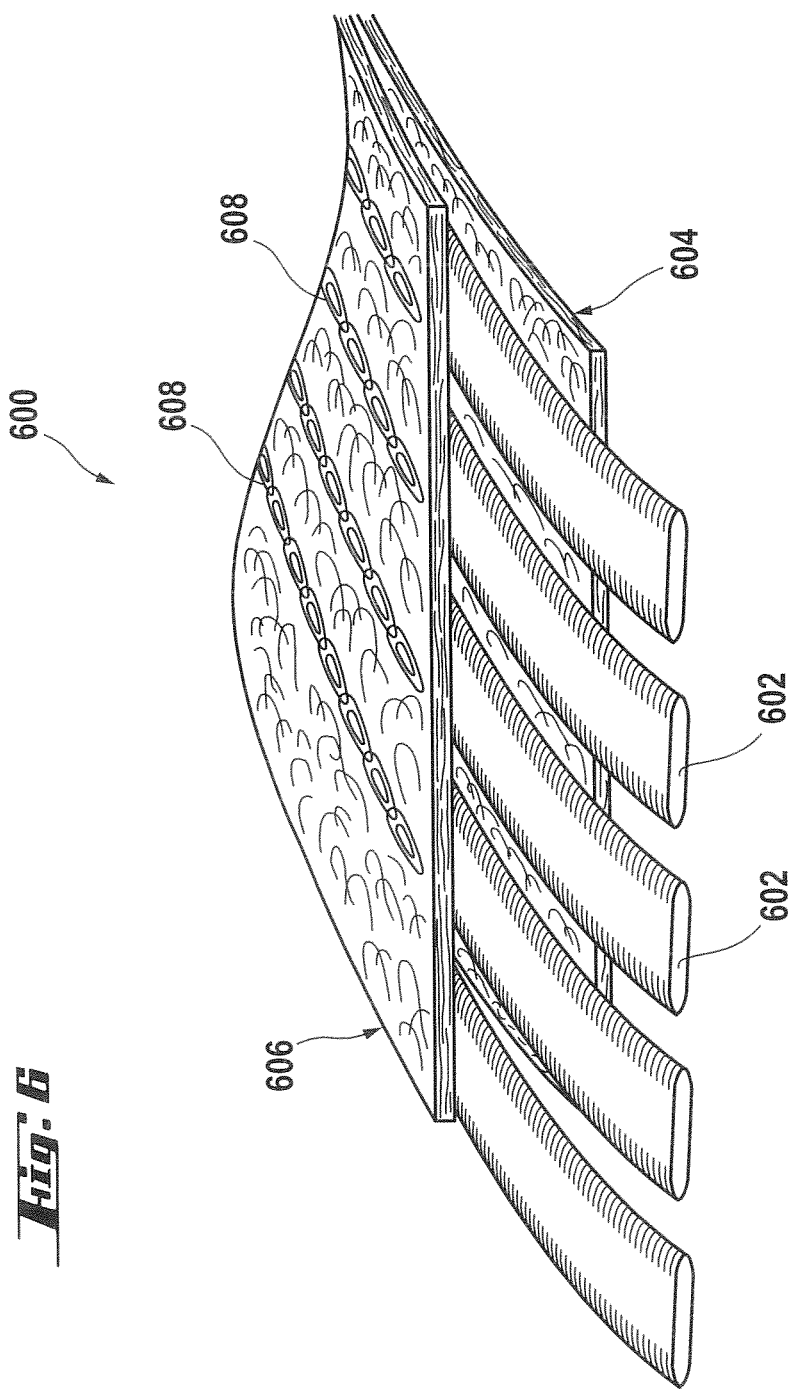
FIG. 6 schematically shows the structure of a unidirectional non-crimp fabric comprising two stabilizing layers formed as mats.
Figure 7:
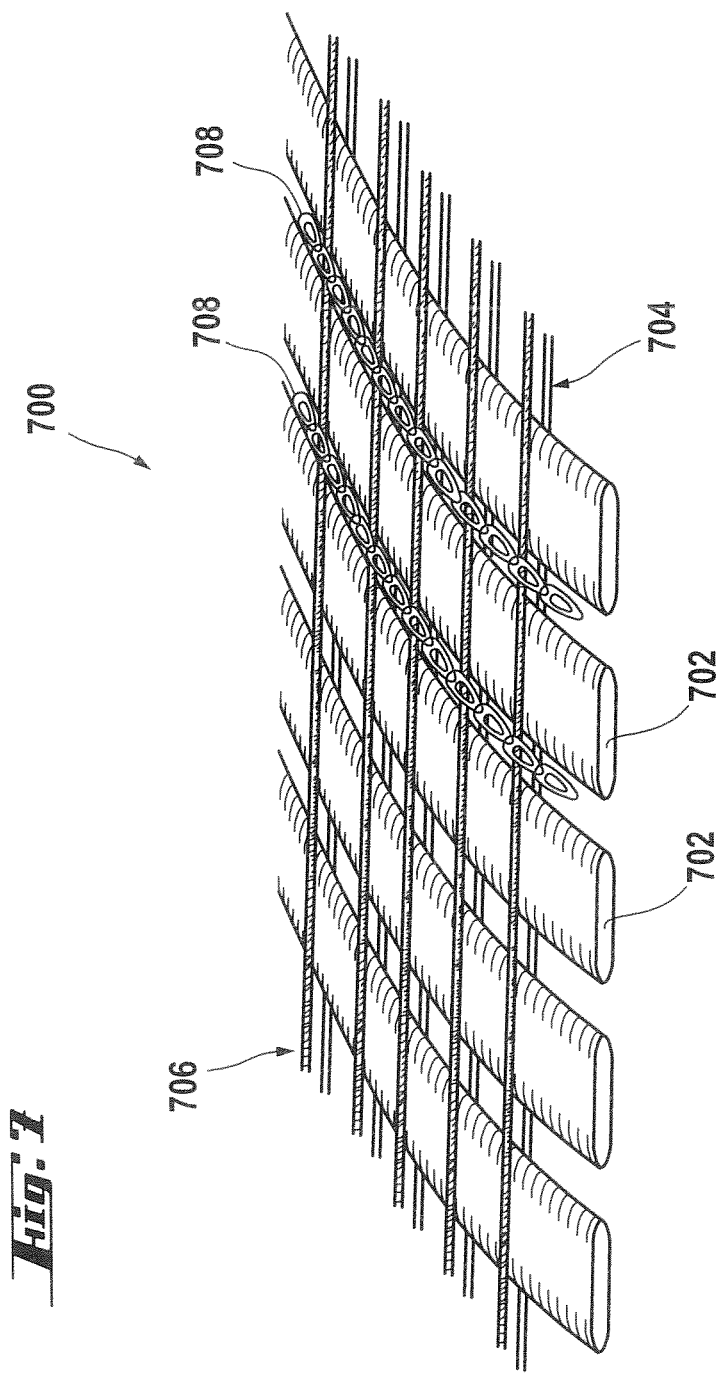
FIG. 7 schematically shows the structure of a unidirectional non-crimp fabric comprising two stabilizing layers formed as weft layers.

The non-crimp fabrics 500, 600, 700 corresponding to FIGS. 5, 6 and 7 differ in that the stabilizing layers 504, 604, 704, 1304, 506, 606, 706, 1306 each have a different configuration. In the present examples, both stabilizing layers 504, 506, 604, 606, 704, 706 each have the same configuration. In the example shown in FIG. 5, both stabilizing layers 504, 506 are a fleece, in the example shown in FIG. 6, both stabilizing layers 604, 606 are a mat, and in the example shown in FIG. 7, both stabilizing layers 704, 706 are a weft layer. In variants not shown in the drawings, both stabilizing layers can each have a different configuration and can have multiple layers. In the case of the variant having stabilizing layers comprising a weft layer, such as is shown in FIG. 7, the weft layer, or at least one of the two weft layers, can also comprise wefts that are less uniformly arranged which, as the case may be, can be arranged in a fashion that is less parallel.

It should be noted that in the examples shown here, the non-crimp fabrics 500, 600, 700 have precisely three layers, namely the two stabilizing layers on either side of a glass fiber roving layer. In variants not shown in the drawings, the non-crimp fabrics can also comprise three, four, five or more stabilizing layers and two, three, four or more unidirectional glass fiber roving layers. They can also comprise further, unspecified layers. All of the layers provided can be arranged in an order adapted to the desired application. Advantageously, the two outermost layers are stabilizing layers.

Figure 13:
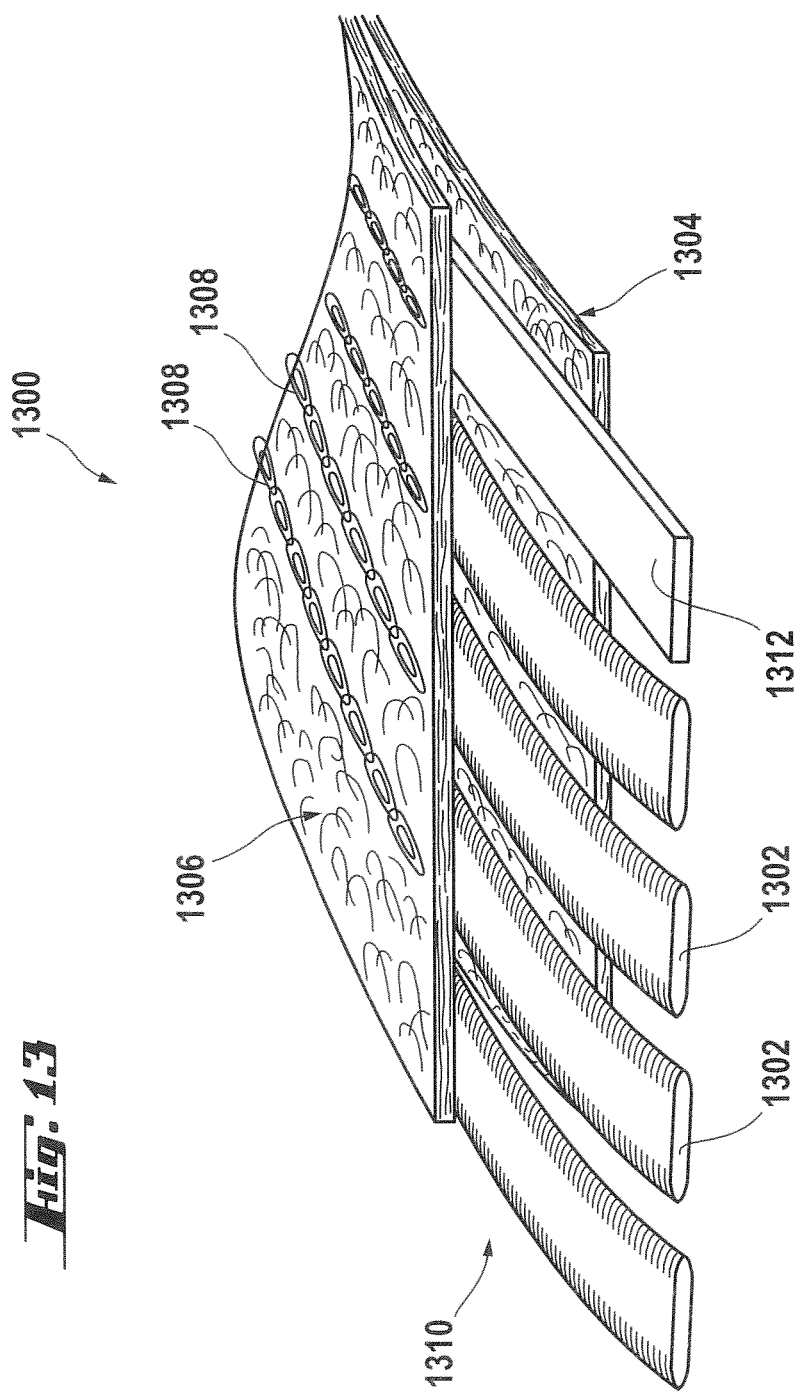
FIG. 13 schematically shows the structure of a unidirectional non-crimp fabric comprising two stabilizing layers of fleece and stabilizing element in the fabric layer.

The unidirectional non-crimp fabric 1300 according to the example shown in FIG. 13, like the fabric shown in FIG. 5, has a fleece as the first and second stabilizing layer 1304, 1306, respectively. It differs from the examples according to FIGS. 5, 6, 7, in particular, in that it comprises at least one stabilizing element 1312 in parallel to the orientation of the non-crimp fabric. In the example shown in FIG. 13, a non-crimp fabric 1300 having four glass fiber rovings 1302 and one stabilizing element 1312 is depicted. In variants, instead of each fifth glass fiber roving 1302, a larger or smaller number of glass fiber rovings 1302 could also be replaced by a stabilizing element 1312. Herein, the stabilizing elements can be arranged at regular or irregular intervals. In the example shown in FIG. 13, the stabilizing element 1312 has a rod shape and is formed as a pultrudate made of glass fiber and resin. In variants, this could also be pultrudates of other fibers than glass fibers, or the resin could be uncured or only partially cured. Preferably, the pultrusion resin is adapted to the matrix resin of the fiber-reinforced composite to be produced.

In the example shown in FIG. 7, comprising weft layers as stabilizing layers 704, 706, the weft layers are formed of glass fiber rovings having a weight of between 34 tex and 300 tex, preferably between 40 tex and 150 tex, particularly preferably between 40 tex and 80 tex. Herein, both stabilizing layers 704, 706 are arranged at essentially the same angle with respect to the non-crimp fabric orientation, namely about 90°. In variants, the weft layer can also be arranged at an angle in the range between 65° and 110°, preferably between 80° and 100°, with respect to the non-crimp fabric orientation. In the present example, the individual wefts have a spacing of a little more than a width of a roving 702 with respect to each other and are bound together in a manner true to mesh by means of stitching to the glass fiber rovings 702 using knitting threads 708.

It should be noted that the material of the stabilizing layers as well as the knitting threads for stitching are adapted to the resin used for further processing to produce a fiber-reinforced plastic component. In particular, hybrid fibers can be used. It is also possible to provide the non-crimp fabric with a binder, to fix it in a desired contour or shape as a preform.

The presence of two stabilizing layers in the proposed unidirectional non-crimp glass roving fabrics allows the three layers, i.e. the first stabilizing layer, the non-crimp fabric layer and the second stabilizing layer to be stitched together by means of pillar stitching. The structure of the pillar stitching is schematically shown in FIG. 8 for a first and a second thread 804, 806 on the front side 800 and the back side 802. For reasons of comparison, FIG. 9 shows the tricot pillar stitch and FIG. 10 the tricot stitch in an analogous fashion, for a first and a second thread 904, 906 and 1004, 1006, respectively, on the front side 900 and 1000, respectively, and the back side 902 and 1002, respectively. In the tricot stitch and the tricot pillar stitch which, unlike the pillar stitch, can also be used in unidirectional non-crimp roving fabrics comprising only one stabilizing layer, the knitting thread is always, or at least partially, routed across the rovings, even if stitching is performed in parallel to the rovings. This has as a result that when the unidirectional non-crimp fabrics are placed in the moulds and they are deformed in the lateral direction, warping may arise, which results in undulations in the non-crimp fabric.

Figure 11:
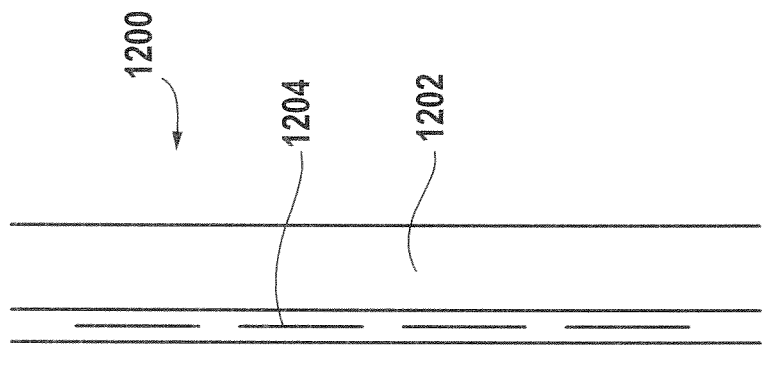
FIG. 11 schematically shows a plan view of a unidirectional non-crimp fabric comprising tricot pillar stitching.

This is schematically shown in FIG. 11 for a unidirectional non-crimp fabric 1100 made of glass fiber rovings 1102 and knitting threads 1104 stitched by means of tricot pillar stitching. When stitching is performed by means of tricot stitching, the undulation formation is even more pronounced. After the composite has been produced, undulation can lead to weaker strengths and stiffnesses than desired in the resulting component and can be regarded as a production defect. Furthermore, as a result of the tricot pillar stitching, or tricot stitching, drapability of the unidirectional non-crimp fabric in the lateral direction can be reduced, which can lead to creasing and/or wrinkling and consequently to reduced strength when the non-crimp fabric is placed in the mould for further processing. Furthermore, depending on the gauge of the knitting thread, routing the knitting thread 1104 across the rovings 1102 can lead to undesirable thickening of the non-crimp fabric. Moreover, depending on the gauge of the knitting thread and the stitching tension, in particular when the stitching is not true to gauge, material can be displaced at the point of the needle entry, which can lead to undulations and constrictions of the glass rovings 1102. This, in turn, can lead to the formation of defects, or so-called "fish eyes", in the cavities at the place of needle entry, at which resin collects when the fabric is infused with resin. Since cured resin is often brittle and, with most resins, the knitting thread only connects with difficulty with the resin matrix, microscopic cracks can arise in the interface region between the knitting thread and the resin matrix under dynamic loading, which can lead to later damage by untimely material fatigue.

Figure 12:
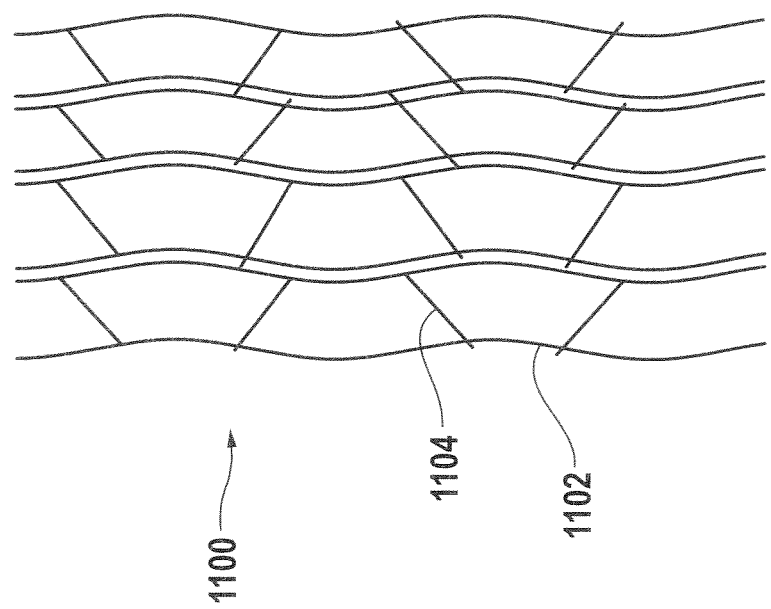
FIG. 12 schematically shows a plan view of a unidirectional non-crimp fabric comprising pillar stitching.

When the knitting threads 1204 are stitched by means of pillar stitching, as schematically shown in FIG. 12, they extend in parallel to the rovings 1202 extending straight as before. The pillar stitching enables much better deformation behaviour in the lateral direction than the tricot stitching or tricot pillar stitching so that wrinkling and creasing can be avoided when the non-crimp fabric is inserted in a mould prior to resin injection. The drapability is thus substantially better with pillar stitching than with tricot stitching or tricot pillar stitching. Moreover, the non-crimp fabrics can be placed in a flatter state without smoothing. In particular, the pillar stitching can be performed in such a manner that the glass fiber rovings are not perforated and no undesired resin islands are formed during further processing. The higher the percentage of knitting threads with respect to the unidirectional non-crimp fabric according to the present invention, the better the impregnating properties. However, if the percentage of the knitting thread is too high, this has a negative impact on drapability, so that the non-crimp fabric becomes stiffer. For the production of the rotor blade belts, in particular, a stitch density of between 5 stitches per inch and 12 stitches per inch has proven suitable in view of good drapability while retaining good impregnating properties. To increase the impregnation speed, thicker knitting threads and/or smaller intervals of the knitting threads can be provided.

Overall, however, the non-crimp fabric according to the invention comprising pillar stitching while keeping the parameters equal, has better impregnating properties for resin than non-crimp corresponding fabrics comprising other stitching connections, such as tricot stitching or tricot pillar stitching. It should be noted that better drapability can be observed with pillar stitching as compared to other stitching methods, even when the stitching is performed at a different angle than parallel to the rovings.

Tests have shown that in comparison to unidirectional non-crimp glass fiber roving fabrics having only one stabilizing layer and tricot stitching or tricot pillar stitching while keeping all other conditions and process parameters equal, the unidirectional non-crimp glass roving fabric of the present invention comprising two stabilizing layers and pillar stitching can achieve an increase in the tensile strength in the range of about 25% to 40% in a glass-fiber-reinforced laminated composite.

If a rotor blade belt is taken for example, which has a maximum thickness of about 100 mm, non-crimp fabrics having a surface weight of 1200 g/m$^2$ require about 110 to 120 layers of a unidirectional non-crimp glass fiber roving fabric having only one stabilizing layer and a tricot stitch or a tricot pillar stitch, whereas when the unidirectional non-crimp glass fiber roving fabric having two stabilizing layers and pillar stitching is used, only 100 to 110 stacked unidirectional non-crimp fabric layers are needed to produce a rotor blade belt having comparable strength and stiffness. The smaller number of non-crimp fabric layers has the advantage that the production of the belt involves shorter laying times and smaller amounts of resin. The resulting weight savings for the belt and therefore also for the rotor blade can also have the effect that the nacelle and the tower of a wind turbine can also be reduced in weight.

Among others, tensile tests in accordance with DIN EN ISO 527-5 were carried out on three variants of unidirectional non-crimp fabrics made of glass fiber rovings. All three of the variants taken here as examples were cured laminar composites of epoxy resin, namely the resin system commercially available as HEXION RIMR135/RIMH137 on the basis of two stacked unidirectional non-crimp glass roving fabrics to achieve the minimum thickness required by the standard. Sample 1 had two non-crimp glass roving fabrics of glass fibers available as NEG Hybon 2002 with 2400 tex, or a nominal surface weight of 944 g/m$^2$, each comprising a first and second stabilizing layer, arranged as weft layers of NEG Hybon 2002 with 68 tex, or a nominal surface weight of 12 g/m$^2$ and at an angle of about 87° with respect to the basic fabric orientation, and an average of 1.8 stitches per cm. The stitching was carried out with a 76 dtex knitting thread made of polyester in the pillar stitch with respect to the weft layers not true to mesh, with a stitch density of 10 stitches per inch essentially parallel to the glass fiber rovings. Sample 2 differed from sample 1 in that the two non-crimp glass fiber roving fabrics were made of glass fibers available as 3B W2020 with 2400 tex, or a nominal surface weight of 944 g/m$^2$, thus fibers made out of high-modulus glass. Sample 3 was a reference sample, which differed from sample 1 in that it only comprised one stabilizing layer, otherwise, however, formed in the same way as sample 1 or sample 2, and in that the stitching, unlike the stitching of sample 1 and sample 2, was carried out using a tricot stitch.

The tensile tests in accordance with DIN EN ISO 527-5 resulted in an average tensile strength of 1166 MPa for sample 1, 1270 MPa for sample 2 and 907 MPa for the reference sample 3. Since for reasons of manufacture, the fiber volume content varied about 53±2 Vol. %, the actual content was measured for each sample and the measured tensile strengths were linearly converted to a fiber content of 53 Vol. %.

Measurements on samples having other resin systems, other glass fiber rovings, other stabilizing layers, in particular also with fleeces and mats, but also with other variants of the weft layers, in particular with reference to its weight, spacing or orientation, as well as with stitching true to mesh and/or gauge, and with stitching having other stitch densities also resulted in increases in tensile strength.

LIST OF REFERENCE NUMERALS 100 rotor blade
102 root section
104 belt
106 shear web
108 shear web reinforcement
110 shell
112 core area
114 leading edge
116 trailing edge
200 rotor blade
202 shear web
204 belt
206 leading edge
208 trailing edge
300 belt
302 resin
304 non-crimp fabric
400 roving
402 filament
500 non-crimp fabric
502 glass fiber roving
504 first stabilizing layer
506 second stabilizing layer
508 knitting thread
600 non-crimp fabric
602 glass fiber roving
604 first stabilizing layer
606 second stabilizing layer
608 knitting thread
700 non-crimp fabric
702 glass fiber roving
704 first stabilizing layer
706 second stabilizing layer
708 knitting thread
800 front side
802 back side
804 first thread
806 second thread
900 front side
902 back side
904 first thread
906 second thread
1000 front side
1002 back side
1004 first thread
1006 second thread
1100 non-crimp fabric
1102 roving
1104 knitting thread
1200 non-crimp fabric
1202 roving
1204 knitting thread
1300 non-crimp fabric
1302 glass fiber roving
1304 first stabilizing layer
1306 second stabilizing layer
1308 knitting thread
1310 fabric layer
1312 stabilizing element

What is claimed is:

1. A unidirectional non-crimp fabric of glass fiber rovings for the production of fiber composites, consisting of:
one glass fiber roving layer of multiple glass fiber rovings each having a length extending in a longitudinal direction of the non-crimp fabric and a width narrower than the length, wherein the multiple glass fiber rovings are spaced apart from each other in the longitudinal direction, and wherein the one glass fiber roving layer has a linear density between 1000 tex and 9600 tex;
a first stabilization layer on an underside of the glass fiber roving layer; and
a second stabilization layer on an upper side of the glass fiber roving layer,
wherein the first stabilization layer and second stabilization layer are sewn to each other by pillar stitching, wherein the pillar stitching extends parallel to the longitudinal direction and does not cross the multiple glass fiber rovings, and
wherein the first and the second stabilization layer are each formed as a weft layer, wherein the weft layers are made of glass fiber rovings having a linear density of between 34 tex and 300 tex, wherein the glass rovings are spaced from each other with a space of at least half the width of the glass fiber rovings of the one glass fiber roving layer and being arranged at an angle in the range of 65° to 110°, with respect to the longitudinal direction of the non-crimp fabric.

2. The unidirectional non-crimp fabric according to claim 1, wherein the pillar stitching extends essentially parallel to the length of the multiple glass fiber rovings.

3. The unidirectional non-crimp fabric according to claim 1, wherein the pillar stitching has a stitch density of between 5 stitches per inch (spi) and 12 stitches per inch (spi).

4. The unidirectional non-crimp fabric according to claim 1, wherein the non-crimp fabric further includes at least one stabilizing element that is arranged parallel to the longitudinal direction of the non-crimp fabric and the length of the multiple glass fiber rovings.

5. The unidirectional non-crimp fabric according to claim 4, wherein the at least one stabilizing element is rod-shaped.

6. The unidirectional non-crimp fabric according to claim 5, wherein the at least one stabilizing element is formed as a pultrudate of glass fiber and resin.

7. A wind turbine component, comprising: the unidirectional non-crimp fabric according to claim 1.

8. The wind turbine component according to claim 7, wherein the wind turbine component is a rotor blade component.

9. The wind turbine component according to claim 7, wherein the wind turbine component is a rotor blade belt.

10. The unidirectional non-crimp fabric according to claim 2, wherein the pillar stitching has a stitch density of between 5 stitches per inch (spi) and 12 stitches per inch (spi), and wherein at least one stabilizing element is present in parallel to the longitudinal direction of the non-crimp fabric and the length of the multiple glass fiber rovings.

11. The unidirectional non-crimp fabric according to claim 10, wherein the at least one stabilizing element is rod-shaped, and wherein the at least one stabilizing element is formed as a pultrudate of glass fiber and resin.

12. The unidirectional non-crimp fabric according to claim 1, wherein both weft layers are arranged at essentially the same angle with respect to the longitudinal direction of the non-crimp fabric.

13. The unidirectional non-crimp fabric according to claim 1, wherein the weft layers are arranged at an angle in the range of 80° to 100°.

14. The unidirectional non-crimp fabric according to claim 1, wherein the pillar stitching is located in the space between the multiple glass fiber rovings.

15. The unidirectional non-crimp fabric according to claim 1, wherein the one glass fiber roving layer has a linear density between 2400 tex and 4800 tex.

* * * * *